(12) United States Patent
Doms

(10) Patent No.: US 10,089,589 B2
(45) Date of Patent: Oct. 2, 2018

(54) INTELLIGENT THRESHOLD EDITOR

(71) Applicant: Andreas Doms, Dresden (DE)

(72) Inventor: Andreas Doms, Dresden (DE)

(73) Assignee: SAP SE, Walldorf (DE)

( * ) Notice: Subject to any disclaimer, the term of this patent is extended or adjusted under 35 U.S.C. 154(b) by 341 days.

(21) Appl. No.: 14/610,359

(22) Filed: Jan. 30, 2015

(65) Prior Publication Data
US 2016/0224920 A1      Aug. 4, 2016

(51) Int. Cl.
*G06Q 10/06*    (2012.01)

(52) U.S. Cl.
CPC .............................. *G06Q 10/06393* (2013.01)

(58) Field of Classification Search
None
See application file for complete search history.

(56) References Cited

U.S. PATENT DOCUMENTS

| | | | | |
|---|---|---|---|---|
| 6,263,290 | B1* | 7/2001 | Williams | G01R 23/16 324/76.12 |
| 6,704,905 | B2* | 3/2004 | Fukushige | G06F 17/30707 702/179 |
| 6,804,563 | B1* | 10/2004 | Lafaye de Micheaux | G06Q 10/06 700/108 |
| 7,076,695 | B2* | 7/2006 | McGee | G06F 11/0709 702/179 |
| 7,324,924 | B2* | 1/2008 | Barajas | G05B 19/4183 340/500 |
| 7,565,266 | B2* | 7/2009 | Yam | G05B 23/0221 700/28 |

(Continued)

FOREIGN PATENT DOCUMENTS

| | | | | |
|---|---|---|---|---|
| EP | 1282269 A1 * | 2/2003 | ......... | G06Q 30/0201 |
| WO | WO-9721244 A1 * | 6/1997 | ............. | H01L 22/20 |
| WO | WO-03005279 A1 * | 1/2003 | .......... | G06F 11/0709 |
| WO | WO-2008107020 A1 * | 9/2008 | ........... | H04L 41/147 |

OTHER PUBLICATIONS

Thanos, George, et al. "Evaluating demand response programs by means of key performance indicators." Communication Systems and Networks (COMSNETS), 2013 Fifth International Conference on. IEEE, 2013. (Year: 2013).*

(Continued)

*Primary Examiner* — Thomas L Mansfield
*Assistant Examiner* — Derick J Holzmacher
(74) *Attorney, Agent, or Firm* — Brake Hughes Bellermann LLP

(57) ABSTRACT

A method for selecting thresholds for a data variable or key performance indicator (KPI) includes processing, by a computer, an actual data set for the data variable or KPI and displaying a perspective view representing the actual data for the data variable or KPI in an interactive threshold editor or selection dialog on a computer-user interface. Processing the actual data set for the data variable or KPI includes statistically curve fitting the actual data set to a probability distribution function and determining a set of pre-selected thresholds based on the parameters obtained by fitting the actual data set to the probability distribution function. The method further involves presenting one or more user-activable UI elements that are configured to receive user acceptance, rejection or adjustment of the pre-selected thresholds as thresholds for the data variable or KPI.

18 Claims, 6 Drawing Sheets

(56) References Cited

U.S. PATENT DOCUMENTS

| | | | | |
|---|---|---|---|---|
| 7,716,253 B2* | 5/2010 | Netz | | G06Q 10/06 707/803 |
| 7,752,303 B2* | 7/2010 | Peracha | | G06F 11/3466 709/224 |
| 8,364,519 B1* | 1/2013 | Basu | | G06Q 10/06393 705/7.38 |
| 8,457,928 B2* | 6/2013 | Dang | | G06F 11/3409 702/186 |
| 8,732,603 B2* | 5/2014 | Tien | | G06Q 10/10 705/26.1 |
| 8,862,969 B2* | 10/2014 | Liikanen | | G06F 11/1048 714/42 |
| 2002/0099578 A1* | 7/2002 | Eicher, Jr. | | G06Q 10/06 705/7.39 |
| 2002/0133320 A1* | 9/2002 | Wegerich | | G05B 23/0297 703/2 |
| 2003/0079160 A1* | 4/2003 | McGee | | G06F 11/0709 714/39 |
| 2006/0010164 A1* | 1/2006 | Netz | | G06Q 10/06 |
| 2006/0106560 A1* | 5/2006 | Folting | | G06F 17/30592 702/102 |
| 2006/0224400 A1* | 10/2006 | Chkodrov | | G06Q 10/00 705/1.1 |
| 2006/0276995 A1* | 12/2006 | Breitgand | | H04L 41/00 702/179 |
| 2007/0005297 A1* | 1/2007 | Beresniewicz | | G05B 23/0235 702/181 |
| 2007/0112607 A1* | 5/2007 | Tien | | G06Q 10/00 705/7.39 |
| 2007/0143175 A1* | 6/2007 | Tien | | G06Q 10/06393 705/7.39 |
| 2007/0179753 A1* | 8/2007 | Barajas | | G05B 19/4183 702/189 |
| 2007/0192060 A1* | 8/2007 | Yam | | G05B 23/0221 702/181 |
| 2007/0198699 A1* | 8/2007 | Peracha | | G06F 11/3466 709/224 |
| 2007/0239573 A1* | 10/2007 | Tien | | G06Q 10/06 705/35 |
| 2007/0265863 A1* | 11/2007 | Tien | | G06Q 30/00 715/825 |
| 2008/0140623 A1* | 6/2008 | Tien | | G06F 17/30646 |
| 2008/0168376 A1* | 7/2008 | Tien | | G06Q 10/10 715/772 |
| 2008/0172414 A1* | 7/2008 | Tien | | G06Q 10/06 |
| 2008/0172629 A1* | 7/2008 | Tien | | G06Q 10/10 715/771 |
| 2008/0189632 A1* | 8/2008 | Tien | | G06Q 30/02 715/764 |
| 2009/0112932 A1* | 4/2009 | Skierkowski | | G06Q 10/06 |
| 2009/0171879 A1* | 7/2009 | Bullen | | G06N 7/005 706/47 |
| 2009/0281845 A1* | 11/2009 | Fukuda | | G06Q 10/06393 705/7.39 |
| 2010/0023362 A1* | 1/2010 | Nguyen | | G06Q 10/06 705/7.39 |
| 2010/0274637 A1* | 10/2010 | Li | | G06Q 10/06 379/265.06 |
| 2012/0053995 A1* | 3/2012 | D'Albis | | G06Q 10/06393 705/7.39 |
| 2012/0162265 A1* | 6/2012 | Heinrich | | G06Q 10/06393 345/661 |
| 2014/0157142 A1* | 6/2014 | Heinrich | | H04L 67/1095 715/744 |
| 2015/0042474 A1* | 2/2015 | Becker Antley | | G06Q 10/107 340/540 |
| 2016/0104076 A1* | 4/2016 | Maheshwari | | G06N 99/005 706/12 |
| 2016/0104093 A1* | 4/2016 | Fletcher | | G06Q 10/06393 705/7.39 |
| 2017/0046127 A1* | 2/2017 | Fletcher | | G06F 7/10 |
| 2017/0046374 A1* | 2/2017 | Fletcher | | G06F 3/0484 |

OTHER PUBLICATIONS

Abran, Alain, and Luigi Buglione. "A multidimensional performance model for consolidating balanced scorecards." Advances in Engineering Software 34.6 (2003): 339-349. (Year: 2003).*

Bhatt, Ganesh D. "An empirical examination of the effects of information systems integration on business process improvement." International Journal of Operations & Production Management 20. 11 (2000): 1331-1359. (Year: 2000).*

* cited by examiner

600

610
Process, by a computer, an actual data set for the data variable or KP

612
Statistically curve fit the actual data set to a probability distribution function

614
Determine a set of pre-selected thresholds based on the parameters obtained by fitting the actual data set to the probability distribution function

620
Display a perspective view representing the actual data for the data variable or KPI in an interactive threshold editor or selection dialog on a computer-user interface

622
Display a graphical or pictorial representation (e.g., a chart or histogram) of the actual data in the interactive threshold editor or selection dialog

624
Display one or more pre-selected thresholds in the interactive threshold editor or selection dialog

626
Present one or more user-activable UI elements configured to receive user acceptance, rejection or adjustment of the pre-selected thresholds as thresholds for the data variable or KPI

FIG. 6

INTELLIGENT THRESHOLD EDITOR

BACKGROUND

Business software or business applications are any software or sets of computer programs that are used by business users to perform various business functions. These business applications are used to increase productivity, to measure productivity and to perform business functions accurately. The business applications are commonly used to process or analyze data from various sources (e.g., databases, production lines, sales channels, etc.) for various data variables or key performance indicators (KPIs) (e.g., amounts, expenses, volumes, costs, profits, etc.) in a business context.

Some business applications may include threshold editor tools, which allow users to specify thresholds to trigger warnings or to visually indicate significant features or abnormalities in the KPI data (e.g., amounts, expenses, volumes, costs, profits, etc.) that may be relevant in the business context. The user-specified thresholds may be used, for example, to highlight or mark the significant data features or abnormalities in data dashboards for quick visual identification, to generate automated messages, or to trigger processes (e.g., remedial business actions) to address the abnormalities, etc.

A traditional threshold editor tool, which may be coupled to a business application, may provide editor dialogs or features (e.g., text input fields, checkboxes, pointer or mouse clicks, etc.) on a user interface (UI). A user may be able to specify a numerical threshold for a KPI, for example, by keyboard entries or mouse clicks on the UI. However, a large number thresholds may have to be specified in some scenarios (e.g., for enterprise performance management business applications) where there are multiple relevant KPIs. In such scenarios, the many keyboard entries or mouse clicks required to enter alphanumeric values for multiple KPI thresholds can be cumbersome, confusing and error-prone. Typical errors may include gaps in data ranges delimited by the thresholds, choosing the wrong data units or scales (e.g. entering 100,00 instead of 100.00), etc. In some instances, the user may not be familiar with the KPIs and may not recognize what data ranges are meaningful with respect to the KPI data generated by the business application in the business context. While the traditional threshold editor tool may let the user define binary relations on the thresholds (e.g., define the data values greater or smaller than a threshold number that should result in a warning or further action), use of the traditional threshold tool lacks an intuitive way of visualizing data ranges. The user may have to use the threshold editor tool repeatedly to refine or select thresholds that are appropriate for the ranges in the actual KPI data for the business context.

Consideration is now given to systems and methods for specifying thresholds for data sets retrieved, generated or processed by business applications or other computer software.

SUMMARY

Business processes and other processes are often analyzed and quantified (using business applications or software) in terms of selected data variables (e.g., key performance indicators (KPIs)). KPI thresholds may be set up to mark or indicate significant features (e.g., low, high or abnormal values) in the KPI data, for example, to facilitate computer monitoring and analysis of the processes and for triggering responses, for example, to unwanted variations in the processes.

In a general aspect, a computer system for selecting thresholds for a data variable or key performance indicator (KPI) includes a processor coupled to a memory, and a computer-user interface. Further, the computer system includes a threshold editor configured to process an actual data set for the data variable or KPI, and display a perspective view representing the actual data for the data variable or KPI in an interactive threshold editor or selection dialog on the computer-user interface.

In a further aspect, the threshold editor provides input elements (e.g., text input field, sliding bars or lines, etc.) in threshold editor or selection dialog on the computer-user interface via which a user can input or select thresholds (e.g., by keyboard or pointing device operations) for the data variable of KPI even as the user is viewing perspective view of data set on the computer-user interface.

The details of one or more implementations are set forth in the accompanying drawings and the description below. Further features of the disclosed subject matter, its nature and various advantages will be more apparent from the accompanying drawings the following detailed description, and the claims.

BRIEF DESCRIPTION OF THE DRAWINGS

FIG. 6 is an illustration of a method for intelligently incorporating knowledge of actual KPI data in a data set in the selection of suitable or meaningful threshold values for the KPI, in accordance with the principles of the present disclosure.

DETAILED DESCRIPTION

Systems and methods for intelligently incorporating knowledge of actual data in determination of suitable or meaningful threshold values for a data set are described herein.

A computing system may include one or more computing devices (e.g., laptop computers, desktop computers, workstations, smartphones, servers, etc.) and databases. High level language computer programs (e.g., business applications) may be installed on one or more of the computing devices in the system to receive, process or analyze data relating to a data variable (e.g., a business process key performance indicator (KPI)). The computing system may have a user interface (UI) for outputting or displaying data.

Users may query/modify/input data and view output data, for example, on the user interface.

In an example computing system, the computer program may be a business application, which is configured to receive, analyze or compute data, which may be related, for example, to one or more KPIs describing the performances of various processes or operations of organizations, business units, etc. Thresholds for the KPI data may be set up, for example, to help determine whether the KPI data or performances meet expectations. These thresholds for the KPI data may be entered by users, for example, via a traditional threshold editor coupled to the business application. Traditionally, the thresholds entered by the users may be empirical values that may be based, for example, on pre-conceived notions of what the KPI data should be rather than what the KPI data actually is.

In contrast to the traditional threshold editor, the systems and methods described herein involve an "intelligent" threshold editor, in accordance with the principles of the present disclosure. The intelligent threshold editor may be configured to intelligently incorporate knowledge of actual data in a data set for the determination of suitable or meaningful thresholds for a data variable or KPI. For this purpose, the intelligent threshold editor may be configured to provide a threshold editor or selection dialog that includes a perspective view of the actual data in the data set, in accordance with the principles of the present disclosure. The perspective view of actual data provided by the intelligent threshold editor in the threshold editor or selection dialog may aid users in selecting suitable or meaningful threshold values for the data variable or KPI.

The intelligent threshold editor may be hosted on one or more computing devices and may be coupled to (or be part of) one or more business applications or other data analytics applications that may be used to generate or produce the data set.

Figure 1:
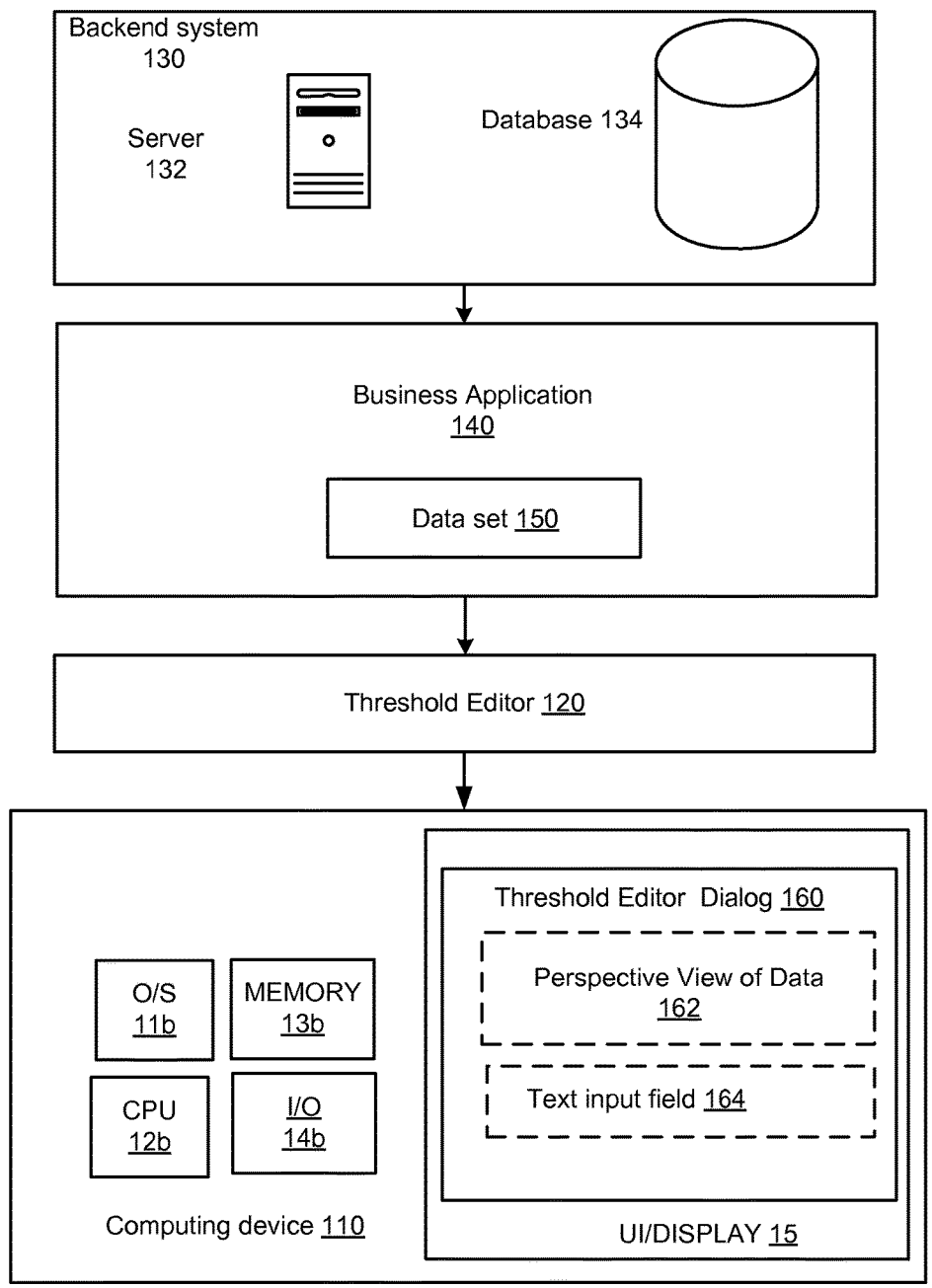
FIG. 1 is a schematic block diagram illustrating an example system for intelligently incorporating knowledge of actual KPI data in a data set in the selection of suitable or meaningful threshold values for the KPI, in accordance with the principles of the present disclosure.

FIG. 1 is a schematic block diagram showing an example system 100 for intelligently incorporating knowledge of actual KPI data (e.g., data set 150) in the selection of suitable or meaningful threshold values for the KPI, in accordance with the principles of the present disclosure.

System 100 includes a threshold editor 120, which is configured to process and analyze the actual data in data set 150. Threshold editor 120 may be further configured to provide a threshold editor or selection dialog 160 to a user of a computing device 110.

Computing device 110, which includes an O/S 11b, a CPU 12b, a memory 13b, and I/O 14b, may further include or be coupled to a user interface (UI) or display 15. Threshold editor 120 may, for example, provide threshold editor or selection dialog 160 on UI/display 15. Threshold editor or selection dialog 160 may include a perspective view 162 of the actual data in data set 150. Perspective view 162 may, for example, include textual and/or graphical or pictorial representations of the actual data in data set 150. The textual representations may, for example, include statistical parameters (e.g., mean, average, maximum, minimum, std. deviations, etc.) of the actual data in data set 150. The graphical or pictorial representations may include visual charts (e.g., bar charts, line charts, area charts, trend charts, etc.) which may, for example, be representations of the frequency or distribution of the actual data in data set 150.

Although computing device 110 is illustrated in the example of FIG. 1 as a single computer, it may be understood that computing device 110 may represent two or more computers in communication with one another. Therefore, it will also be appreciated that any two or more components 110-150 of system 100 may similarly be executed using some or all of the two or more computing devices in communication with one another. Conversely, it also may be appreciated that various components illustrated as being external to computer 110 may actually be implemented therewith.

Computing device 110 (e.g., a desktop computer, a mainframe computer, a personal computer, a mobile computing device, a laptop, a tablet, a smart phone, or other computing device) may have or support different UI technologies (e.g., graphical user interfaces (GUI), voice user interface (VUI), telephone user interface (TUI), etc.) and different UI components. It will be understood that I/O 14b components in computing device 110 may be customized for generating UI/display 15 appropriate to the UI technology and components supported by the computing platform (e.g., computing device 110) for user interaction with threshold editor 120/ threshold editor or selection dialog 160. Thus, for example, UI/display 15 for a smartphone with a touchscreen or voice recognition capabilities and a desktop computer with a mouse and keyboard, may be different and may be configured to generate different UI/display 15 instances as may be appropriate for the different smartphone and desktop computer devices.

Threshold editor 120 may provide input elements (e.g., text input field 164, sliding bars or lines, etc.) in threshold editor or selection dialog 160 on UI/display 15 via which the user can input or select thresholds (e.g., by keyboard or pointing device operations) for the data variable of KPI even as the user is viewing perspective view 162 of data set 150 on UI/display 15. In example implementations, threshold editor 120 may pre-select and display data points or features in perspective view 162 as thresholds based, for example, on the statistical properties of the actual data in data set 150. Threshold editor 120 may be configured so that the user can change, confirm or reject the pre-selected thresholds, for example, by point and click operations on UI/display 15. Further, in some example implementations, threshold editor 120 may be configured so the user can, additionally or alternatively, independently select data points or features in perspective view 162 as thresholds.

In example scenarios, data set 150, which is processed by threshold editor 120, may be business data (e.g., KPI data) related to performances or operations of a business or organization. However, it will be understood that data set 150 processed by threshold editor 120 is not limited to business data. In other scenarios, data set 150 may be data of any type including, for example, scientific data (e.g., metrological data, epidemiological data, census data, etc.). In general, any type or number of data may be processed or analyzed by threshold editor 120.

In the example shown in FIG. 1, data set 150, which is processed by threshold editor 120, may be generated or produced by a computer program (e.g., business application 140), for example, by processing or analyzing business data in a backend system 130 (which may, for example, include one or more servers 132, databases 134 or other components (not shown) of an enterprise performance platform or other business computing network platform). Business application 140 and threshold editor 120 may be hosted on one or more standalone or networked physical or virtual computing machines (including, for example, computing device 110 and backend system 130). In some example implementations, threshold editor 120 may be included as a part of business application 110. In other example implementations, threshold editor 120 may be a generic threshold editor (e.g., hosted on computing device 110) which can be coupled to one or more business applications (e.g., business application 140), other computer programs, or directly to a source of data set 150.

In example implementations, threshold editor 120 may be configured to determine and pre-select one or more thresholds for data set 150, for example, by statistical curve fitting of the data in data set 150. In some implementations, threshold editor 120 may be configured to statistically curve fit the data to a normal distribution function on an assumption that the data in data set 150 has a normal probability distribution. Threshold editor 120 may then pre-select thresholds based on the fitted normal distribution parameters. In other implementations, threshold editor 120 may not rely on the assumption that the data in data set 150 has a normal or Gaussian distribution but may be configured to evaluate different statistical distribution functions (e.g., normal distribution, log-normal distribution, beta distribution, F-distribution, etc.) to determine which distribution function best fits the data in data set 150. Threshold editor 120 may then determine the pre-selected thresholds based on the characteristics and parameters of the best-fitting distribution function. In either case, threshold editor 120 may be configured to present the pre-selected thresholds as suggested thresholds in threshold editor or selection dialog 160 for user confirmation or rejection.

Example Scenario

Figure 2:
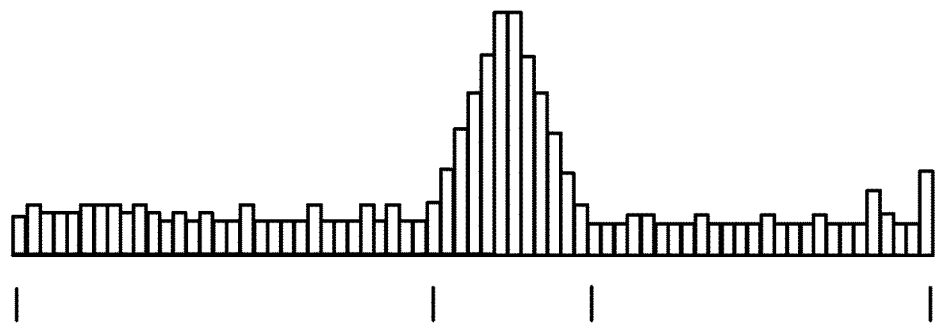
FIG. 2 is a histogram illustrating data values for an example KPI.

In an example scenario (e.g., a business planning scenario), data set 150 may be a multi-dimensional data cube obtained from a database (e.g., data base 134) having data points or values for several data dimensions or domains (KPIs). The data values or points in each dimension or domain may have their own statistical characteristics. An example statistical characteristic, which may be visualized as a histogram, may be the frequency of data values along the data dimension or domain. FIG. 2 shows, for example, a histogram 200 of the frequency of data values for an example KPI (e.g., External services expenses per quarter). Each bar of frequency histogram 200 (as shown in FIG. 2) may represent an interval or range of KPI data values. The KPI data values or points in the dimension or domain may have a frequency distribution or spread characterized by a typical probability distribution function (e.g., a normal or Gaussian probability distribution).

Figure 3:
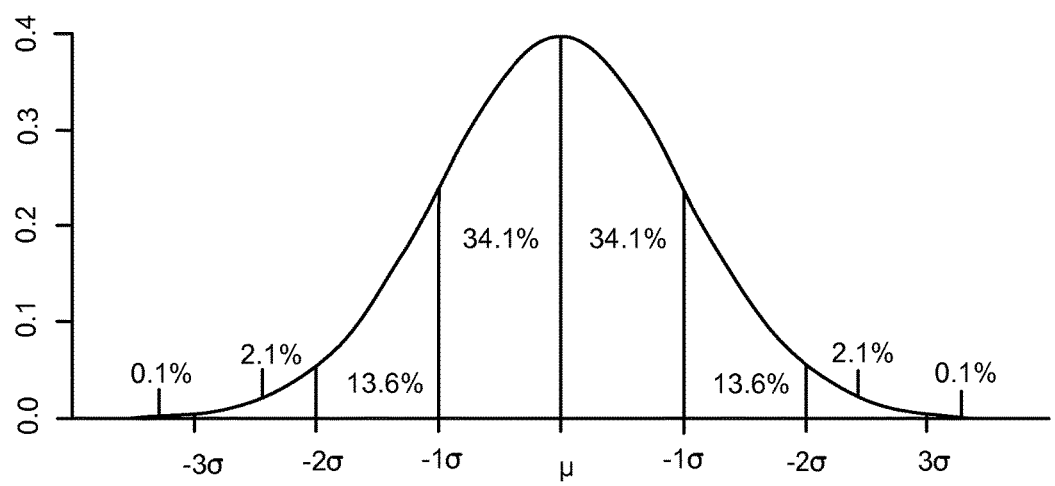
FIG. 3 is an illustration of a bell shape of a normal or Gaussian probability distribution function.

A normal distribution function (as shown for example in FIG. 3) has a bell shape that may be defined by the following probability density equation:

$$Y=\{1/[\sigma*\text{sqrt}(2\pi)]\}*e-(x-\mu)^2/2\sigma^2,$$

where x is a normal random variable, $\mu$ is the mean, and $\sigma$ is the standard deviation. The foregoing normal distribution function has a property that the data values within a certain range of the mean have a higher frequency than the data values outside of the certain range. For example, as shown in FIG. 3, every normal distribution function (regardless of its mean or standard deviation) conforms to the following mathematical rule: about 68% of the total number of data values (i.e., the area under the curve) are within 1 standard deviation of the mean; about 95% of the total number of data values are within 2 standard deviations of the mean; and about 99.7% of the total number of data values are within 3 standard deviations of the mean.

In an example implementation of system 100, threshold editor 120 may be configured to fit the data values or points in each dimension or domain of data set 150 to a normal probability distribution function. For data in a given dimension or domain of data set 150, the parameters (e.g., $\mu$ and $\sigma$) of the normal probability distribution function may be fitted, for example, to meet the criteria that 95% of the data values are within $-2\sigma$ and $+2\sigma$ of the mean $\mu$. Threshold editor 120 may be configured to pre-select KPI thresholds based on parameters (e.g., $\mu$ and $\sigma$) of the normal probability distribution function. In an example implementation, threshold editor 120 may be configured to pre-select two KPI thresholds, for example, as $-2\sigma$ and $+2\sigma$. In alternate implementations, other parameters (e.g., $\mu$, $-\sigma$, $+\sigma$, $-3\sigma$, etc.) may be chosen as the pre-selected KPI thresholds.

Further, threshold editor 120 may present the pre-selected KPI thresholds (e.g. $-2\sigma$ and $+2\sigma$) along with other options for user selection or adjustment of KPI thresholds in threshold editor or selection dialog 160 along with perspective view 162 on UI/display 15.

Figure 4:
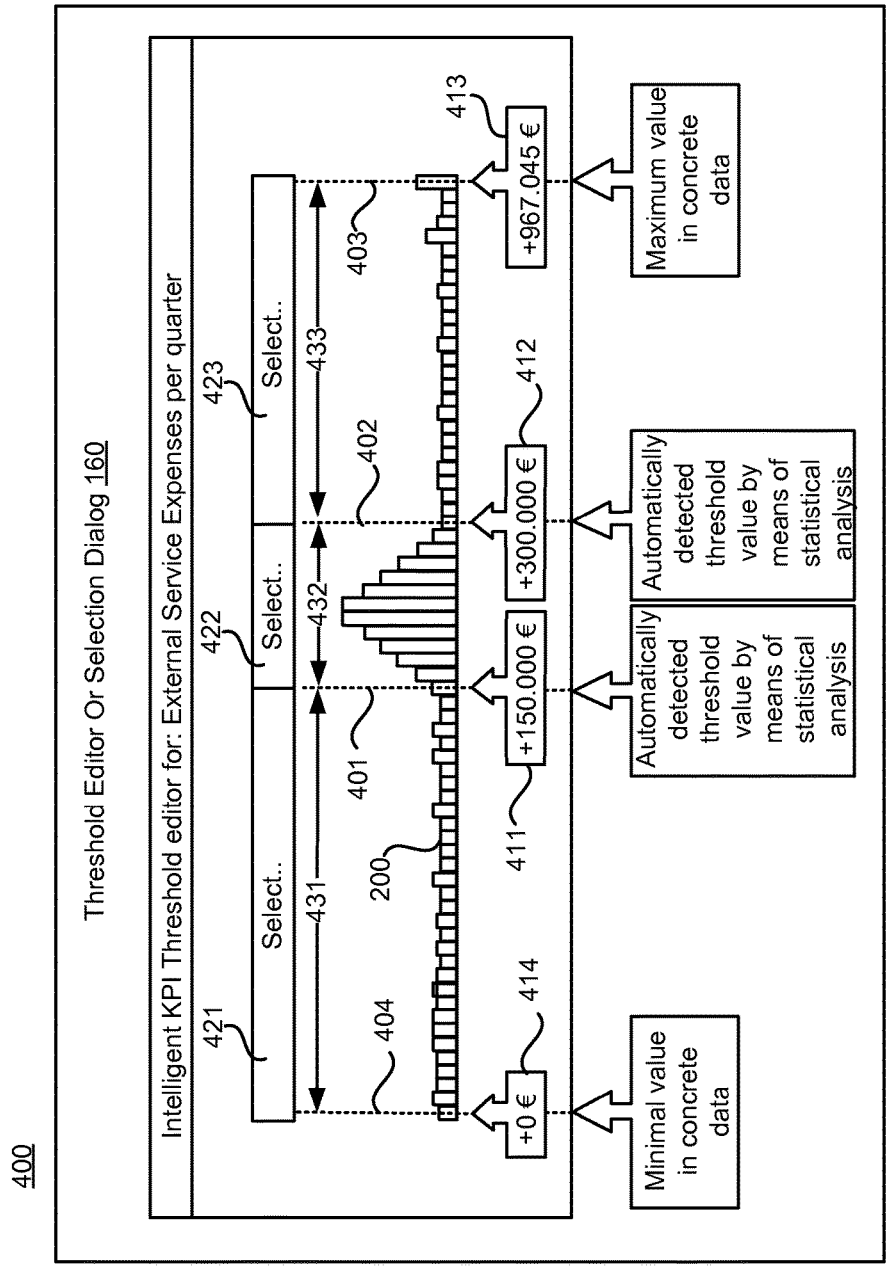
FIG. 4 illustrates an example perspective view of a data set, which may be displayed in a threshold editor or selection dialog by a threshold editor, in accordance with the principles of the present disclosure.

FIG. 4 shows an example perspective view 400, which may be displayed by threshold editor 120 in threshold editor or selection dialog 160, for the foregoing example scenario, in accordance with the principles of the present disclosure.

As shown in FIG. 4, perspective view 400 may include histogram 200 of the frequency data values for the example KPI (External services expenses per quarter). Pre-selected KPI thresholds $-2\sigma$ and $+2\sigma$ may be marked with UI elements (e.g., slider lines 401 and 402) to visually indicate that they are suggested but user selectable thresholds. Similarly, the maximum and minimum data values in histogram 200 may be marked with UI elements (e.g., slider lines 403 and 404) to indicate that they are also suggested but user selectable thresholds. Each of slider lines 401-404 may be attached to further UI elements (editable text boxes 411-414) which may display numerical values of the positions of slider lines 401-404 along the x-axis (e.g., the suggested but user selectable thresholds values, for example, $-2\sigma$, $+2\sigma$, maximum and minimum, respectively). The user may confirm a pre-selected threshold as an acceptable threshold, for example, by selecting or clicking on the corresponding UI element (e.g., slider lines 401-404, or boxes 411-414). The user may by default reject one or more of the pre-selected threshold as an acceptable threshold, for example, by omitting to select or click on the corresponding UI elements. Further, the user may edit or adjust one or more of the thresholds, for example, by clicking and sliding a corresponding one or more of boxes 411-414 (or slider lines 401-404 to which the boxes are attached) along the x-axis. The numerical data values displayed in the boxes may change according to the positions of boxes 411-414/slider lines 401-404 along the x-axis so that the user remains visually informed of the edited or selected thresholds values during the process.

Perspective view 400 may further include UI elements (e.g., state indicators 421-423) which can be user activated to assign states (e.g., good, bad, warning, critical, etc.) to data ranges (e.g., data ranges 431-433, respectively) that are delimited by the thresholds (e.g., $-2\sigma$ or $+2\sigma$). The states available for assignment (e.g., Good", "Warning" or "Critical") to the data ranges may be pre-defined by threshold editor 120. Alternatively or additionally, threshold editor 120 may be configured to allow the user to define custom states related to the thresholds or data ranges by providing further UI elements to enter, for example, one or more of a string, a color indicator and an alert level, etc.

Threshold editor 120 may be configured so that if the user rejects (i.e. does not click or select) a suggested threshold (e.g., $2\sigma$ or $+2\sigma$) the rejected threshold is not used as a KPI threshold for further data analytics. The user may have to click on at least one of the suggested thresholds (e.g., $2\sigma$ or $+2\sigma$) and optionally adjust it as described above to define a KPI threshold for further data analytics. Further, the user may have to assign a state (e.g., good, bad, warning, critical, etc.) to at least one data range (e.g., data ranges 431-433) of histogram 200, for example, by activating at least one of state indicators 421-423, to properly define a KPI threshold for further data analytics.

Figure 5:
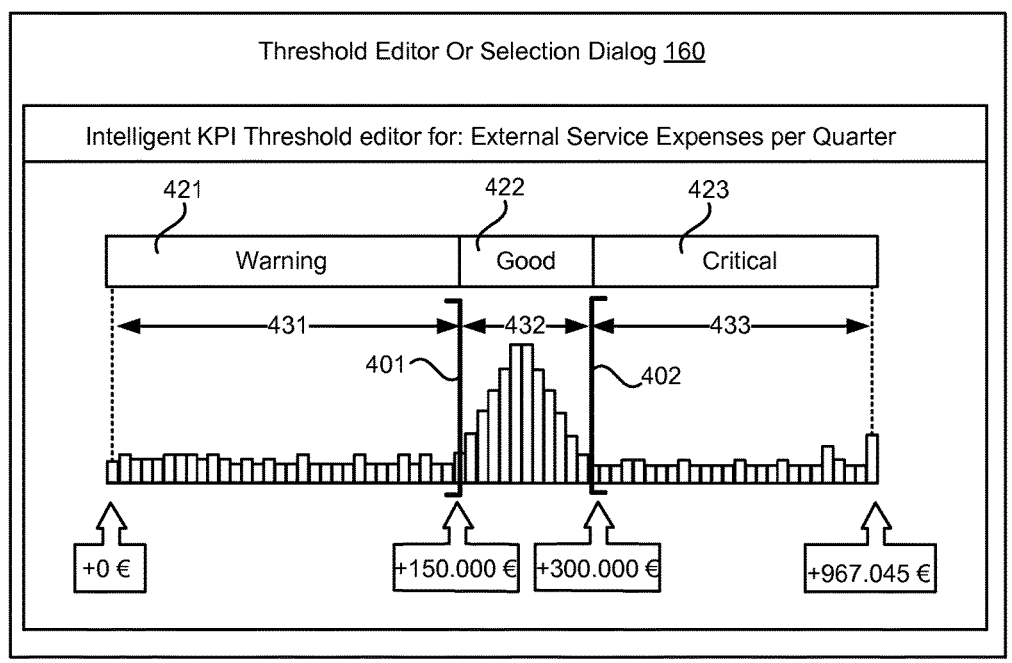
FIG. 5 shows another example perspective view of a data set, which may be displayed in the threshold editor or selection dialog by the threshold editor, in accordance with the principles of the present disclosure.

In another example implementation, threshold editor 120 may be configured to present the user with a choice of defining the thresholds for data set 150 as an open or a closed interval using suitably configured UI elements. An UI element indicating an interval boundary (e.g., slider lines 401-402) may be configured so that upon user activation (e.g., by pointing to and holding the UI element and then releasing the left mouse key) the UI element switches between two possible states i.e. an open interval or a closed interval. FIG. 5 shows an example perspective view 500, in which the UI elements (e.g., slider lines 401-402) have been activated to indicate an open data interval (e.g., ]–2σ, +2σ[) in histogram 200. FIG. 5 also shows example user selection of state indicators 421-423 as "warning, "good" and "critical" states, respectively, for the data ranges 431-433 delimited by the selected threshold values –2σ and +2σ. State indicator 422 (good) may visually indicate, for example, that data values in the open interval between 150.000 and 300.000 are defined to be "good" values for the KPI. State indicator 421 (warning) and closed interval boundary slider line 401 may visually indicate, for example, that all data values less than or equal to 150.000 are defined be "warning" values for the KPI. Similarly, state indicator 421 (critical) and closed interval boundary slider line 402 may visually indicate, for example, that all values greater than or equal to 300.000 are defined to be "critical" values for the KPI.

As described in the foregoing example scenario, threshold editor 120 by incorporating information relating to actual KPI data (exemplified by perspective views 162/400/500) in the threshold editor or selection dialog may enable a user to make informed selections of thresholds for analyzing or processing KPI data without having to rely on pre-conceived notions of what the data should be.

FIG. 6 shows an example method 600 for selecting thresholds for a data variable or KPI. Method 600 may include processing, by a computer, an actual data set (e.g., data set 150) for the data variable or KPI (610), and providing a perspective view representing the actual data for the data variable or KPI in an interactive threshold editor or selection dialog on a computer-user interface (620).

Processing the actual data set 610 may include statistically curve fitting the actual data set to a probability distribution function (612) and determining a set of pre-selected thresholds based on the parameters obtained by fitting the actual data set to the probability distribution function (614).

In an example implementation, the probability distribution function may be a normal or Gaussian distribution function. The parameters obtained by fitting the actual data set may include a mean μ and a standard deviation σ of the fitted normal distribution function, and the maximum ("max") and minimum ("min") data values in the actual data set. Further, determining a set of pre-selected thresholds 614 may include selecting a threshold proportional to one of μ, σ, max and min. As an example, the set of pre-selected thresholds may include –2σ and 2σ.

In another example implementation, statistically curve fitting the actual data set to a probability distribution function 612 may include evaluating different statistical distribution functions (e.g., normal distribution, log-normal distribution, beta distribution, F-distribution, etc.) to determine which distribution function best fits the actual data set and determining the set of pre-selected thresholds 614 may include determining the pre-selected thresholds based on the characteristics and parameters of the best-fitting distribution.

In method 600, providing a perspective view representing the actual data for the data variable or KPI in an interactive threshold editor or selection dialog 620 may include displaying a graphical or pictorial representation (e.g., a chart or histogram) of the actual data in the interactive threshold editor or selection dialog (622), displaying one or more pre-selected thresholds in the interactive threshold editor or selection dialog (624), and presenting one or more user-activable UI elements configured to receive user acceptance, rejection or adjustment of the pre-selected thresholds as thresholds for the data variable or KPI (626).

In method 600, presenting one or more user-activable UI elements 626 may include presenting one or more user-activable UI elements that are configured to define a data range delimited by a threshold as having an open interval boundary or a closed interval boundary, and/or are configured to define an action state (e.g., good, warning critical, a string, a color indicator and an alert level, etc.) for a data range delimited by a threshold. Presenting one or more user-activable UI elements 626 may include presenting one or more of slider lines, bars and boxes, drop down menus, check boxes, buttons, text input fields, etc.

The various techniques described herein may be implemented in digital electronic circuitry, or in computer hardware, firmware, software, or in combinations of them. The various techniques may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, logic circuitry or special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
   a processor; and
   a memory,
   the processor and memory implementing a computer-user interface for a visual display of a perspective view of a data set, the computer-user interface including an interactive threshold editor,
   the interactive threshold editor including one or more interactive visual threshold markers overlaying the visual display of the perspective view of the data set, each of the one or more interactive visual threshold markers suggesting a threshold data value for the data set based on prior system-initiated statistical analysis and characterization of features of the data set, the suggested thresholds providing a selection of scale and units to visually distinguish features of the data set, each of the interactive visual threshold markers coupled to an interactive user interface element for graphical acceptance, rejection or adjustment, by a user, of a suggested threshold as a display threshold,
   the interactive threshold editor configured to:
   in response to user selection of the display threshold, process the data set for display based on the display threshold;
   display, on the computer-user interface, a perspective view representing the data set that has been processed based on the user selection of the display threshold; and
   use the user selected display threshold to visually mark features of the data set in the perspective view displayed on the computer-user interface.

2. The system of claim 1, wherein the threshold editor is further configured to statistically curve fit the data set to a probability distribution function and determine a set of pre-selected thresholds based on parameters obtained by fitting the data set to the probability distribution function.

3. The system of claim 2, wherein the probability distribution function is the normal distribution function and the parameters obtained by fitting the data set include a mean $\mu$ and a standard deviation $\sigma$ of the fitted normal distribution function, and the maximum and minimum data values in the data set.

4. The system claim 3, wherein the threshold editor is further configured to determine a set of pre-selected thresholds by selecting at least one threshold proportional to one of the mean $\mu$, the standard deviation $\sigma$, the maximum data value and the minimum data value.

5. The system claim 2, wherein the threshold editor is further configured to evaluate more than one different statistical distribution function to determine which type of distribution function best fits the data set and determine a set of pre-selected thresholds based on the and parameters of the best-fitting distribution.

6. The system claim 2, wherein the threshold editor is further configured to display the perspective view representing the data set in the interactive threshold editor or selection by displaying a graphical representation of the data set and displaying one or more pre-selected thresholds in the interactive threshold editor or a selection dialog.

7. The system claim 6, wherein the threshold editor is further configured to present one or more user-activable UI elements that are configured to define a data range delimited by a threshold as having an open interval boundary or a closed interval boundary, and/or are configured to define an action for a data range delimited by a threshold.

8. A method comprising:
   visually displaying, by a computer, a perspective view of a data set on a computer-user interface;
   the computer-user interface including an interactive threshold editor,
   the interactive threshold editor including one or more interactive visual threshold markers overlaying the visual display of the perspective view of the data set, each of the one or more interactive visual threshold markers suggesting a threshold data value for the data set based on prior system-initiated statistical analysis and characterization of features of the data set, the suggested thresholds providing a selection of scale and units to visually distinguish features of the data set, each of the interactive visual threshold markers coupled to an interactive user interface element for graphical acceptance, rejection or adjustment, by a user, of a suggested threshold as a display threshold;
   in response to user selection of the display threshold, processing the data set for display based on the display threshold;
   displaying, on the computer-user interface, a perspective view representing the data set that has been processed based on the user selection of the display threshold; and
   using the user selected display threshold to visually mark features of the data set in the perspective view displayed on the computer-user interface.

9. The method of claim 8, wherein processing the data set includes statistically curve fitting the data set to a probability distribution function and determining a set of pre-selected thresholds based on the parameters obtained by fitting the data set to the probability distribution function.

10. The method of claim 9, wherein the probability distribution function is the normal distribution function and the parameters obtained by fitting the data set include a mean μ and a standard deviation σ of the fitted normal distribution function, and the maximum and minimum data values in the data set.

11. The method of claim 10, further comprising: determining a set of pre-selected thresholds including a threshold proportional to one of the mean μ, the standard deviation σ, the maximum data value, and the minimum data value.

12. The method of claim 9, wherein statistically curve fitting the data set to a probability distribution function includes evaluating more than one different statistical distribution function to determine which type of distribution function best fits the data set and determining a set of pre-selected thresholds based on characteristics and parameters of the best-fitting distribution.

13. The method of claim 9, wherein displaying the perspective view representing the data set in the interactive threshold editor or selection includes displaying a graphical representation of the data in the interactive threshold editor or a selection dialog and displaying one or more pre-selected thresholds in the interactive threshold editor or selection dialog.

14. The method of claim 9, further comprising: presenting one or more user-activable UI elements in the user interface, the one or more user-activable UI elements configured to define a data range delimited by a threshold as having an open interval boundary or a closed interval boundary, and/or are configured to define an action for a data range delimited by a threshold.

15. A non-transitory computer readable medium, comprising:
instructions capable of being executed on a microprocessor,
which instructions when executed allow a computer device to
visually display a perspective view of a data set on a computer-user interface,
the computer-user interface including an interactive threshold editor,
the interactive threshold editor including one or more interactive visual threshold markers overlaying the visual display of the perspective view of the data set, each of the one or more interactive visual threshold markers suggesting a threshold data value for the data set based on prior system-initiated statistical analysis and characterization of features of the data set, the suggested thresholds providing a selection of scale and units to visually distinguish features of the data set, each of the interactive visual threshold markers coupled to an interactive user interface element for graphical acceptance, rejection or adjustment, by a user, of a suggested threshold as a display threshold;
in response to user selection of the display threshold, process the data set for display based on the display threshold;
display, on the computer-user interface, a perspective view representing the data set that has been processed based on the user selection of the display threshold; and
use the user selected display threshold to visually mark features of the data set in the perspective view displayed on the computer-user interface.

16. The non-transitory computer readable medium of claim 15, wherein the instructions when executed on the microprocessor cause the computer device to process the data set by statistically curve fitting the data set to a probability distribution function and determine a set of pre-selected thresholds based on the parameters obtained by fitting the data set to the probability distribution function.

17. The non-transitory computer readable medium of claim 15, wherein the instructions when executed on the microprocessor cause the computer device to process the data set by evaluating more than one different statistical distribution function to determine which type of distribution function best fits the data set and determine a set of pre-selected thresholds based on characteristics and parameters of the best-fitting distribution function.

18. The non-transitory computer readable medium of claim 15, wherein the instructions when executed on the microprocessor cause the computer device to display a graphical representation of the data in the interactive threshold editor or selection dialog, display one or more pre-selected thresholds in the interactive threshold editor or selection dialog, and presenting one or more user-activable UI elements that are configured to receive graphical acceptance, rejection or adjustment, by a user, of the one or more pre-selected thresholds as display thresholds for the data set.

\* \* \* \* \*